United States Patent
Thubert et al.

(10) Patent No.: US 12,537,703 B2
(45) Date of Patent: Jan. 27, 2026

(54) FEATURE SHARING AND HANDOFF FOR POWER OPTIMIZATION

(71) Applicant: Cisco Technology, Inc., San Jose, CA (US)

(72) Inventors: Pascal Thubert, Roquefort les Pins (FR); Gonzalo A. Salgueiro, Raleigh, NC (US); Derek W. Engi, Pleasant Ridge, MI (US); Marisol Palmero Amador, Toledo (ES)

(73) Assignee: Cisco Technology, Inc., San Jose, CA (US)

( * ) Notice: Subject to any disclaimer, the term of this patent is extended or adjusted under 35 U.S.C. 154(b) by 399 days.

(21) Appl. No.: 18/344,561

(22) Filed: Jun. 29, 2023

(65) Prior Publication Data

US 2024/0154826 A1    May 9, 2024

Related U.S. Application Data

(60) Provisional application No. 63/382,668, filed on Nov. 7, 2022.

(51) Int. Cl.
*H04L 12/12* (2006.01)
*H04L 12/46* (2006.01)
*H04L 45/745* (2022.01)

(52) U.S. Cl.
CPC .......... *H04L 12/12* (2013.01); *H04L 12/4633* (2013.01); *H04L 45/74591* (2022.05)

(58) Field of Classification Search
None
See application file for complete search history.

(56) References Cited

U.S. PATENT DOCUMENTS

| | | | |
|---|---|---|---|
| 9,495,308 B2 * | 11/2016 | Dalal | H04L 63/0272 |
| 9,591,582 B1 * | 3/2017 | Rabii | H04L 43/028 |
| 2010/0157830 A1 | 6/2010 | Yazaki et al. | |
| 2011/0051642 A1 | 3/2011 | Krishnaswamy | |
| 2011/0205898 A1 | 8/2011 | Ichiki et al. | |
| 2012/0131137 A1 | 5/2012 | Singh et al. | |
| 2013/0058319 A1 * | 3/2013 | Fan | H04L 49/15 370/328 |
| 2014/0304535 A1 | 10/2014 | Banerjea et al. | |

(Continued)

*Primary Examiner* — Anh Vu H Ly
(74) *Attorney, Agent, or Firm* — Rutan & Tucker, LLP; Ravi Mohan

(57) ABSTRACT

Described herein are devices, systems, methods, and processes for intelligently managing power consumption in a network by allocating a power budget for packet processing. The power budget can be allocated based on criticality and/or the trust level of the flow. A network device may determine which subsets of features can be executed within the power budget for specific flows. Network devices can signal their capability to run features based on power consumption and adherence to the power budget, allowing for cooperative end-to-end power-based decision-making and policy enforcement. Network devices unable to run all features can select a subset of the features within their power budget and a viable path where other network devices can execute the missing features. Source route information can be added to indicate the path and missing features to be executed by network devices down the segment routing path.

20 Claims, 10 Drawing Sheets

(56) References Cited

U.S. PATENT DOCUMENTS

| | | | |
|---|---|---|---|
| 2015/0181529 A1* | 6/2015 | Birnbaum | H04W 52/0258 370/311 |
| 2020/0177660 A1* | 6/2020 | Connor | H04L 69/326 |
| 2021/0064443 A1* | 3/2021 | Tsirkin | G06F 8/443 |
| 2022/0317692 A1* | 10/2022 | Guim Bernat | G05D 1/0217 |

* cited by examiner

FEATURE SHARING AND HANDOFF FOR POWER OPTIMIZATION

PRIORITY

This application claims the benefit of and priority to U.S. Provisional Application No. 63/382,668, filed Nov. 7, 2022, which is incorporated in its entirety herein.

The present disclosure relates to network communication. More particularly, the present disclosure relates to power consumption management in network nodes for offloading features based on power budget specifications.

BACKGROUND

In modern network communication systems, various network devices, such as routers, switches, and line cards, are responsible for processing and forwarding data packets. These devices often implement multiple features, such as ternary content-addressable memory (TCAM) filtering, virtual private network (VPN) decapsulation, and deep packet inspection (DPI), to ensure efficient and secure data transmission. However, the execution of these features can consume significant amounts of power, which can lead to increased energy costs and environmental concerns.

Power consumption management in network devices has become an important aspect of network design and operation. Network administrators often need to balance the power consumption of network devices with the performance and functionality requirements of the network. Traditional power management techniques may focus on optimizing the power consumption of individual devices or components, but they may not consider the power budget constraints of the entire network or the specific power requirements of different features.

Moreover, existing power management techniques may not provide a flexible and dynamic approach to managing power consumption in network nodes. This can result in suboptimal power consumption and performance trade-offs, as well as increased complexity in network management. There is a need for improved power consumption management techniques that can address the power challenges while maintaining the desired performance and functionality of the network.

SUMMARY OF THE DISCLOSURE

Systems and methods for power consumption management in network nodes for offloading features based on power budget specifications in accordance with embodiments of the disclosure are described herein. In some embodiments, a first network node, includes a processor, at least one network interface controller configured to provide access to a network, and a memory communicatively coupled to the processor. The memory includes a power consumption management logic that is configured to identify at least one power budget specification associated with a packet, identify one or more features associated with the packet, determine a subset of features of the one or more features to be offloaded to a second network node based on the at least one power budget specification associated with the packet, and offload the subset of features to the second network node.

In some embodiments, the subset of features to be offloaded to the second network node is determined based on feature-to-power association data for the first network node and the at least one power budget specification.

In some embodiments, to determine the subset of features to be offloaded to the second network node, the power consumption management logic is further configured to: transmit first signaling to a plurality of network nodes including the second network node indicating a request to offload the subset of features; and receive second signaling from the second network node indicating a capability of the second network node to execute the subset of features for the packet within the at least one power budget specification.

In some embodiments, at least one of the first signaling or the second signaling is conveyed via a metadata channel or a signaling channel.

In some embodiments, the second signaling includes an indication of a current power draw of the second network node.

In some embodiments, the second signaling includes an indication of a per-feature power consumption at the second network node for at least one feature in the subset of features.

In some embodiments, to offload the subset of features to the second network node, the power consumption management logic is further configured to: add route data to the packet, the route data including an indication of the subset of features to be executed by the second network node; and forward the packet to the second network node.

In some embodiments, the at least one power budget specification includes respective power budget specifications for each of the first network node and the second network node.

In some embodiments, the at least one power budget specification includes a total power budget specification in aggregate for a set of network nodes including the first network node and the second network node.

In some embodiments, to determine the subset of features to be offloaded to the second network node, the power consumption management logic is further configured to: select a path for the packet based on the at least one power budget specification associated with the packet, the path including the second network node and a third network node; determine a second subset of features of the one or more features to be offloaded to the third network node based on the at least one power budget specification associated with the packet; offload the second subset of features to the third network node; and execute one or more non-offloaded features of the one or more features for the packet.

In some embodiments, the one or more features include at least one of ternary content-addressable memory (TCAM) filtering, virtual private network (VPN) decapsulation, or deep packet inspection (DPI).

In some embodiments, the first network node includes at least one of a router, a switch, or a line card.

In some embodiments, a second network node, includes a processor, at least one network interface controller configured to provide access to a network, and a memory communicatively coupled to the processor. The memory includes a power consumption management logic that is configured to identify at least one power budget specification associated with a packet, receive first signaling from a first network node indicating a request to offload a subset of features for the packet, transmit second signaling from to the first network node indicating a capability of the second network node to execute the subset of features for the packet within the at least one power budget specification, receive the packet from the first network node, and execute the subset of features for the packet.

In some embodiments, the power consumption management logic is further configured to verify, before transmitting the second signaling, that the second network node is capable of executing the subset of features for the packet within the at least one power budget specification based on feature-to-power association data for the second network node and the at least one power budget specification.

In some embodiments, at least one of the first signaling or the second signaling is conveyed via a metadata channel or a signaling channel.

In some embodiments, the second signaling includes an indication of a current power draw of the second network node.

In some embodiments, the second signaling includes an indication of a per-feature power consumption at the second network node for at least one feature in the subset of features.

In some embodiments, the subset of features includes at least one of ternary content-addressable memory (TCAM) filtering, virtual private network (VPN) decapsulation, or deep packet inspection (DPI).

In some embodiments, the power consumption management logic is further configured to forward the packet to a next hop network node based on route data associated with the packet.

In some embodiments, a method for network power consumption management, includes identifying at least one power budget specification associated with a packet, identifying one or more features associated with the packet, determining a subset of features of the one or more features to be offloaded to a second network node based on the at least one power budget specification associated with the packet, and offloading the subset of features to the second network node.

Other objects, advantages, novel features, and further scope of applicability of the present disclosure will be set forth in part in the detailed description to follow, and in part will become apparent to those skilled in the art upon examination of the following or may be learned by practice of the disclosure. Although the description above contains many specificities, these should not be construed as limiting the scope of the disclosure but as merely providing illustrations of some of the presently preferred embodiments of the disclosure. As such, various other embodiments are possible within its scope. Accordingly, the scope of the disclosure should be determined not by the embodiments illustrated, but by the appended claims and their equivalents.

BRIEF DESCRIPTION OF DRAWINGS

The above, and other, aspects, features, and advantages of several embodiments of the present disclosure will be more apparent from the following description as presented in conjunction with the following several figures of the drawings.

Figure 1:
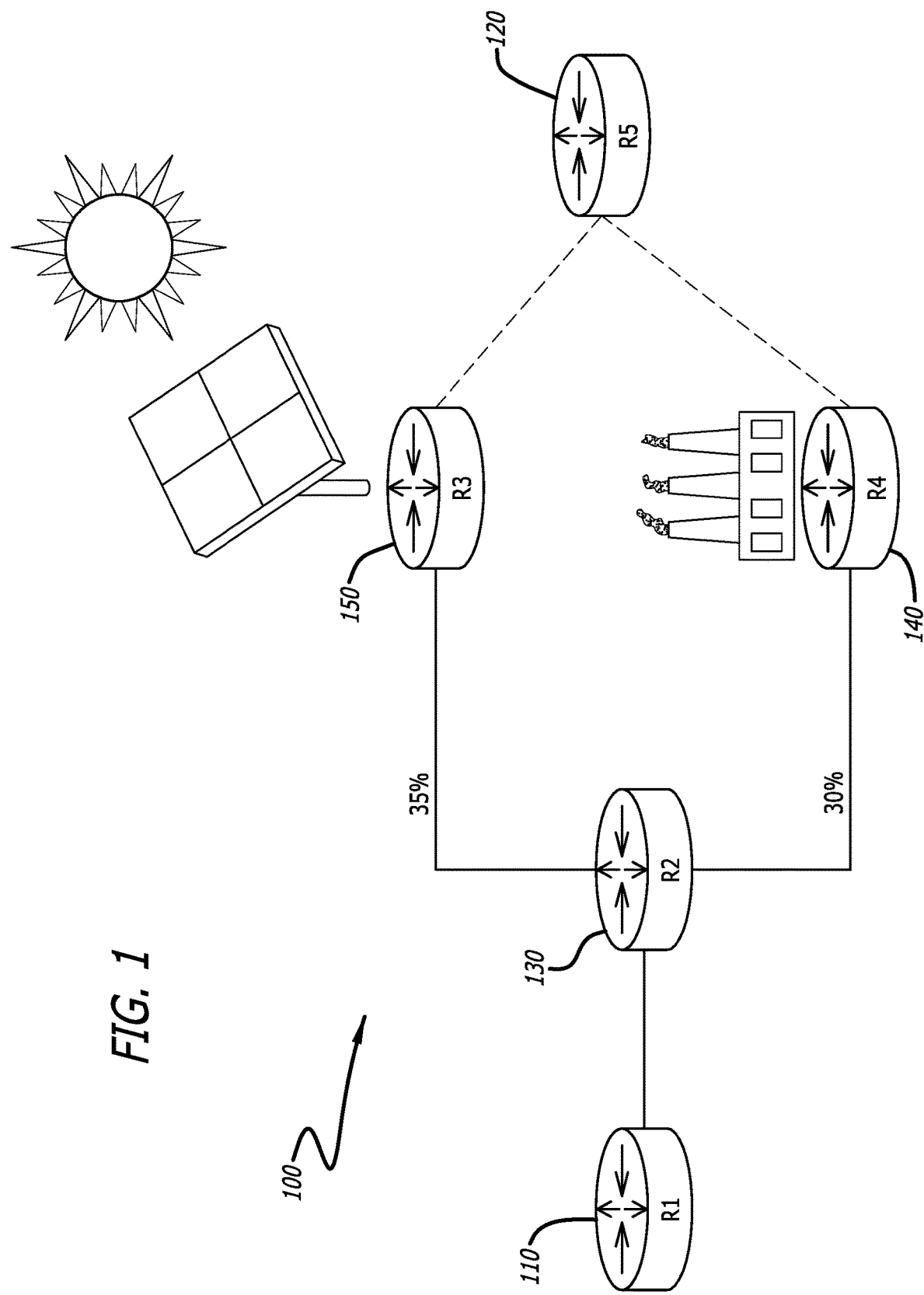
FIG. 1 a schematic diagram of a network with network devices powered by various power source types in accordance with an embodiment of the disclosure.

Corresponding reference characters indicate corresponding components throughout the several figures of the drawings. Elements in the several figures are illustrated for simplicity and clarity and have not necessarily been drawn to scale. For example, the dimensions of some of the elements in the figures might be emphasized relative to other elements for facilitating understanding of the various presently disclosed embodiments. In addition, common, but well-understood, elements that are useful or necessary in a commercially feasible embodiment are often not depicted in order to facilitate a less obstructed view of these various embodiments of the present disclosure.

DETAILED DESCRIPTION

In response to the issues described above, devices and methods are discussed herein that intelligently manage power consumption in a network by cooperatively making end-to-end power consumption-based decisions on feature execution and allocation. Embodiments of the present disclosure provide a method for allocating a predefined power budget for packet processing based on the criticality of the flow and/or the level of trust in the flow. The power budget may be determined on a per-device basis and/or in aggregate based on per-feature power consumption.

In many embodiments, based on the power budget, a network device (e.g., a router (such as, but not limited to, an ingress edge router), a switch, a line card, etc.) can determine which subsets of features it may run within the budget for specific flows. In a number of embodiments, network devices may be capable of intelligently signaling their capability to run features to their neighbors, based on their power consumption and adherence to the power budget. In numerous embodiments, some network devices may store (cache) data about neighbor devices' signaled capability to execute certain features. The stored data about the neighbor devices' capability may be used for a collection of packets (e.g., for making feature offloading decisions). In numerous additional embodiments, when signaling their capability to execute features to neighbor devices, some network devices can indicate a duration and/or a volume associated with the capability (e.g., a network device may signal that based on the power budget, it is, for a certain period, capable of executing certain features for a certain quantity of packets). In a variety of embodiments, this capability signaling allows for intelligent and cooperative end-to-end power-based decision-making between network devices, as well as the ability to implement power consumption-based policy enforcement.

In some embodiments, the capability signaling can also include current power draw and efficiency metrics associated with each feature to influence path selection based on candidate effectiveness (e.g., which candidate network device is the most effective power efficiency-wise). In more embodiments, a network device that cannot run all the necessary features may select a subset that it is capable of running according to the power budget and a viable path where the network devices are viably power-capable of running the missing features. The network device can add route data (e.g., source route data, such as, but not limited to, segment routing header (SRH) micro-segment identifiers (uSIDs)) to the packet indicating that path and the missing features to be run at those network devices. In additional embodiments, the network devices down the segment routing (SR) path can perform the features as indicated.

In further embodiments, this cooperative intelligent decision-making based on power consumption can be implemented within a single network device (e.g., the feature offloading may be from an ingress line card to an egress line card), between a pair of collaborating network devices, or across multiple network devices in a network. The disclosure enables power-aware forwarding decisions so that the next hop(s) can be selected to run the offloaded feature, and the feature(s) to offload may be signaled in the packet. This approach may help to ensure that the network runs the full suite of features across the network as a whole while optimizing power consumption. In still more embodiments, it may be determined that a feature may not be executed at all for a packet given the power budget(s) because executing the feature anywhere in the network may cause power consumption at one or more network devices to exceed one or more of the power budget(s).

Aspects of the present disclosure may be embodied as an apparatus, system, method, or computer program product. Accordingly, aspects of the present disclosure may take the form of an entirely hardware embodiment, an entirely software embodiment (including firmware, resident software, micro-code, or the like) or an embodiment combining software and hardware aspects that may all generally be referred to herein as a "function," "module," "apparatus," or "system." Furthermore, aspects of the present disclosure may take the form of a computer program product embodied in one or more non-transitory computer-readable storage media storing computer-readable and/or executable program code. Many of the functional units described in this specification have been labeled as functions, in order to emphasize their implementation independence more particularly. For example, a function may be implemented as a hardware circuit comprising custom very large-scale integration (VLSI) circuits or gate arrays, off-the-shelf semiconductors such as logic chips, transistors, or other discrete components. A function may also be implemented in programmable hardware devices such as via field programmable gate arrays, programmable array logic, programmable logic devices, or the like.

Functions may also be implemented at least partially in software for execution by various types of processors. An identified function of executable code may, for instance, comprise one or more physical or logical blocks of computer instructions that may, for instance, be organized as an object, procedure, or function. Nevertheless, the executables of an identified function need not be physically located together but may comprise disparate instructions stored in different locations which, when joined logically together, comprise the function and achieve the stated purpose for the function.

Indeed, a function of executable code may include a single instruction, or many instructions, and may even be distributed over several different code segments, among different programs, across several storage devices, or the like. Where a function or portions of a function are implemented in software, the software portions may be stored on one or more computer-readable and/or executable storage media. Any combination of one or more computer-readable storage media may be utilized. A computer-readable storage medium may include, for example, but not limited to, an electronic, magnetic, optical, electromagnetic, infrared, or semiconductor system, apparatus, or device, or any suitable combination of the foregoing, but would not include propagating signals. In the context of this document, a computer readable and/or executable storage medium may be any tangible and/or non-transitory medium that may contain or store a program for use by or in connection with an instruction execution system, apparatus, processor, or device.

Computer program code for carrying out operations for aspects of the present disclosure may be written in any combination of one or more programming languages, including an object-oriented programming language such as Python, Java, Smalltalk, C++, C#, Objective C, or the like, conventional procedural programming languages, such as the "C" programming language, scripting programming languages, and/or other similar programming languages. The program code may execute partly or entirely on one or more of a user's computer and/or on a remote computer or server over a data network or the like.

A component, as used herein, comprises a tangible, physical, non-transitory device. For example, a component may be implemented as a hardware logic circuit comprising custom VLSI circuits, gate arrays, or other integrated circuits; off-the-shelf semiconductors such as logic chips, transistors, or other discrete devices; and/or other mechanical or electrical devices. A component may also be implemented in programmable hardware devices such as field programmable gate arrays, programmable array logic, programmable logic devices, or the like. A component may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may alternatively be embodied by or implemented as a component.

A circuit, as used herein, comprises a set of one or more electrical and/or electronic components providing one or more pathways for electrical current. In certain embodiments, a circuit may include a return pathway for electrical current, so that the circuit is a closed loop. In another embodiment, however, a set of components that does not include a return pathway for electrical current may be referred to as a circuit (e.g., an open loop). For example, an integrated circuit may be referred to as a circuit regardless of whether the integrated circuit is coupled to ground (as a return pathway for electrical current) or not. In various embodiments, a circuit may include a portion of an integrated circuit, an integrated circuit, a set of integrated circuits, a set of non-integrated electrical and/or electrical components with or without integrated circuit devices, or the like. In one embodiment, a circuit may include custom VLSI circuits, gate arrays, logic circuits, or other integrated circuits; off-the-shelf semiconductors such as logic chips, transistors, or other discrete devices; and/or other mechanical or electrical devices. A circuit may also be implemented as a synthesized circuit in a programmable hardware device such as field programmable gate array, programmable array logic, programmable logic device, or the like (e.g., as firmware, a netlist, or the like). A circuit may comprise one or more silicon integrated circuit devices (e.g., chips, die, die planes, packages) or other discrete electrical devices, in electrical communication with one or more other components through electrical lines of a printed circuit board (PCB) or the like. Each of the functions and/or modules described herein, in certain embodiments, may be embodied by or implemented as a circuit.

Reference throughout this specification to "one embodiment," "an embodiment," or similar language means that a particular feature, structure, or characteristic described in connection with the embodiment is included in at least one embodiment of the present disclosure. Thus, appearances of the phrases "in one embodiment," "in an embodiment," and similar language throughout this specification may, but do not necessarily, all refer to the same embodiment, but mean "one or more but not all embodiments" unless expressly specified otherwise. The terms "including," "comprising," "having," and variations thereof mean "including but not limited to", unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise.

Further, as used herein, reference to reading, writing, storing, buffering, and/or transferring data can include the entirety of the data, a portion of the data, a set of the data, and/or a subset of the data. Likewise, reference to reading, writing, storing, buffering, and/or transferring non-host data can include the entirety of the non-host data, a portion of the non-host data, a set of the non-host data, and/or a subset of the non-host data.

Lastly, the terms "or" and "and/or" as used herein are to be interpreted as inclusive or meaning any one or any combination. Therefore, "A, B or C" or "A, B and/or C" mean "any of the following: A; B; C; A and B; A and C; B and C; A, B and C." An exception to this definition will occur only when a combination of elements, functions, steps, or acts are in some way inherently mutually exclusive.

Aspects of the present disclosure are described below with reference to schematic flowchart diagrams and/or schematic block diagrams of methods, apparatuses, systems, and computer program products according to embodiments of the disclosure. It will be understood that each block of the schematic flowchart diagrams and/or schematic block diagrams, and combinations of blocks in the schematic flowchart diagrams and/or schematic block diagrams, can be implemented by computer program instructions. These computer program instructions may be provided to a processor of a computer or other programmable data processing apparatus to produce a machine, such that the instructions, which execute via the processor or other programmable data processing apparatus, create means for implementing the functions and/or acts specified in the schematic flowchart diagrams and/or schematic block diagrams block or blocks.

It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. Other steps and methods may be conceived that are equivalent in function, logic, or effect to one or more blocks, or portions thereof, of the illustrated figures. Although various arrow types and line types may be employed in the flowchart and/or block diagrams, they are understood not to limit the scope of the corresponding embodiments. For instance, an arrow may indicate a waiting or monitoring period of unspecified duration between enumerated steps of the depicted embodiment.

In the following detailed description, reference is made to the accompanying drawings, which form a part thereof. The foregoing summary is illustrative only and is not intended to be in any way limiting. In addition to the illustrative aspects, embodiments, and features described above, further aspects, embodiments, and features will become apparent by reference to the drawings and the following detailed description. The description of elements in each figure may refer to elements of proceeding figures. Like numbers may refer to like elements in the figures, including alternate embodiments of like elements.

Referring to FIG. 1, a schematic diagram of a network 100 with network devices powered by various power source types in accordance with an embodiment of the disclosure is shown. The network 100 can include a plurality of devices, e.g., routers 110, 130, 140 and 150, which can be in communication with each other and/or a remote server, such as a cloud-based server 120. The network 100 depicted in FIG. 1 is shown as a simplified, conceptual network. Those skilled in the art will understand that a network 100 can include a large variety of devices and be arranged in a virtually limitless number of combinations based on the desired application and available deployment environment.

Additionally, it is recognized that the terms "power" and "energy" are often used interchangeably in many colloquial settings but have distinct differences. Specifically, energy is accepted as the capacity of a system or device to do work (such as in kilowatt-hours (kWh)), while power is the rate at which energy is transferred (often in watts (W)). Power represents how fast energy is being used or produced. With this in mind, it should be understood that various elements of the present disclosure may utilize common terms like "power lines," "power grids," power source," "power consumption," and "power plant" when describing energy delivery and utilization, even though those skilled in the art will recognize that those elements are delivering or processing energy (specifically electricity) at a certain rate of power. References to these terms are utilized herein specifically to increase the ease of reading.

Traditionally, devices operating within a network 100 have not considered various aspects of operation that can relate to the overall sustainability of the network. For example, devices in communication networks have often used grid-supplied energy as a primary power source. This grid-supplied energy can regularly provide energy that has been generated by a negative environmental impacts-heavy power source such as a coal-powered power plant. However, modern power grids often have more diverse and cleaner energy sources for the provided generated energy. Some devices can still be powered by power sources that utilize fossil fuels, such as the router R4 140 as depicted in FIG. 1. Alternatively, some devices can operate by using renewable sources of energy, such as the router R3 150 which is conceptually depicted as being powered by solar power.

Those skilled in the art will recognize that the generation of electricity within the various power plants often creates some pollution or, more generally, one or more negative environmental impacts, which can often come in the form of emissions. However, these negative environmental impacts can come in a variety of forms including, but not limited to, land use, ozone depletion, ozone formation inhibition, acidification, eutrophication (freshwater, marine, and terrestrial), abiotic resource depletion (minerals, metals, and fossil fuels), toxicity, water use, negative soil quality change, ionizing radiation, hazardous waste creation, etc. As such, these negative environmental impact measurements can be measured with specific units to quantify these changes. Various aspects of energy use can be associated with one or more of these negative environmental impacts and classified as one or more sustainability-related attributes.

In the embodiment depicted in FIG. 1, the operation of a coal-powered power plant will create a sizeable amount of negative environmental impacts in the form of carbon emissions and the like. Contrast that with a solar array which may not create emissions when generating electricity, but may negative environmental impacts, such as carbon emission generation, associated with the production and/or disposal of the solar array. Various methods of measuring these negative environmental impacts may occur. One measurement may be to examine the waste products created by the power generated (such as nuclear waste, vs. solar array e-waste, etc.).

Another measurement of negative environmental impacts that can be utilized when comparing power sources is to determine the amount of greenhouse or carbon emissions released per unit of electricity generated. Specifically, various embodiments described herein may utilize the $CO_2e$ kg/kWh metric which measure the amount of kilowatt hours produced per kilogram of carbon dioxide gases released into the environment. Therefore, when discussing a negative environmental impacts-heavy power source compared to a clean(er) power source, the clean power source can, for example, have a better $CO_2e$ kg/kWh rating compared to the negative environmental impacts-heavy power source. Utilizing a cleaner power source thus provides for a more sustainable network operation.

In order the maximize the overall sustainability of a network, it may be desirable to increase the use of cleaner power sources with a lower overall negative environmental impact as opposed to power sources with a higher overall negative environmental impact when operating the network. Thus, there can be a need to be aware of the source of energy provided at each device along the route of data travel. Additionally, other factors such as the attributes unique to each device can be factored in, along with the current and/or expected traffic, etc. Once known, an optimal method of traversing the data may need to be calculated. As discussed in more detail, this path algorithm can be utilized to better optimize the locations selected within a network for data travel.

Other methods may be utilized to increase sustainability in network operations. In many embodiments, the network devices themselves may have one or more features or other capabilities that can allow for a more efficient operation. For example, a network router may be operated in a lower power mode or be powered off entirely for a specific period of time or until an event occurs. Additional embodiments may utilize various other power-saving capabilities that can be turned on or off remotely or in response to an event or predetermined threshold being exceeded. Often, operations performed by the network devices can be utilized in scenarios where network performance will not be affected or is affected such that no loss in user experience occurs. By utilizing less power during operation, a higher level of sustainability can be achieved.

Together, the type of power source providing electricity to a network device, along with the various sustainability-related capabilities of the router can be understood as the sustainability-related attributes of that network device. During operation, one or more devices within the network may seek and collect the sustainability-related attributes of various network devices, which can provide insight into both the type of power source providing power to the device, but also the various capabilities of the network device that may be activated to provide more efficient operation.

Additionally, when generating various scores, metrics, or other evaluations of the network devices within a network 100, the sustainability-related attributes can vary based on a variety of factors such as the time of day, current network traffic, expected network traffic, and historical usage patterns. For example, a network router may receive energy from a solar power source during the day but receives energy from a coal-powered power plant at night. In these instances, an averaged score may be used, or a unique score may be generated at the time of operation. In another example, network traffic may be such that removing one or more network devices from the optimal sustainable data paths may negatively affect user experiences, such as when a sporting event occurs. As such, scores may be generated at numerous times depending on the desired application. Often, the act of measurement may negatively affect sustainability such that determining the proper amount of measurements for a given outcome may be determined.

Although a specific embodiment for a network 100 is described above with respect to FIG. 1, any of a variety of systems and/or processes may be utilized in accordance with embodiments of the disclosure. For example, the network could be broken into a plurality of partitions, wherein each partition could have specific needs, service level agreements, etc. that can alter sustainability-optimization. The elements depicted in FIG. 1 may also be interchangeable with other elements of FIGS. 2-10 as required to realize a particularly desired embodiment. Augmented protocols to carry out these described processes are described below.

Figure 2:
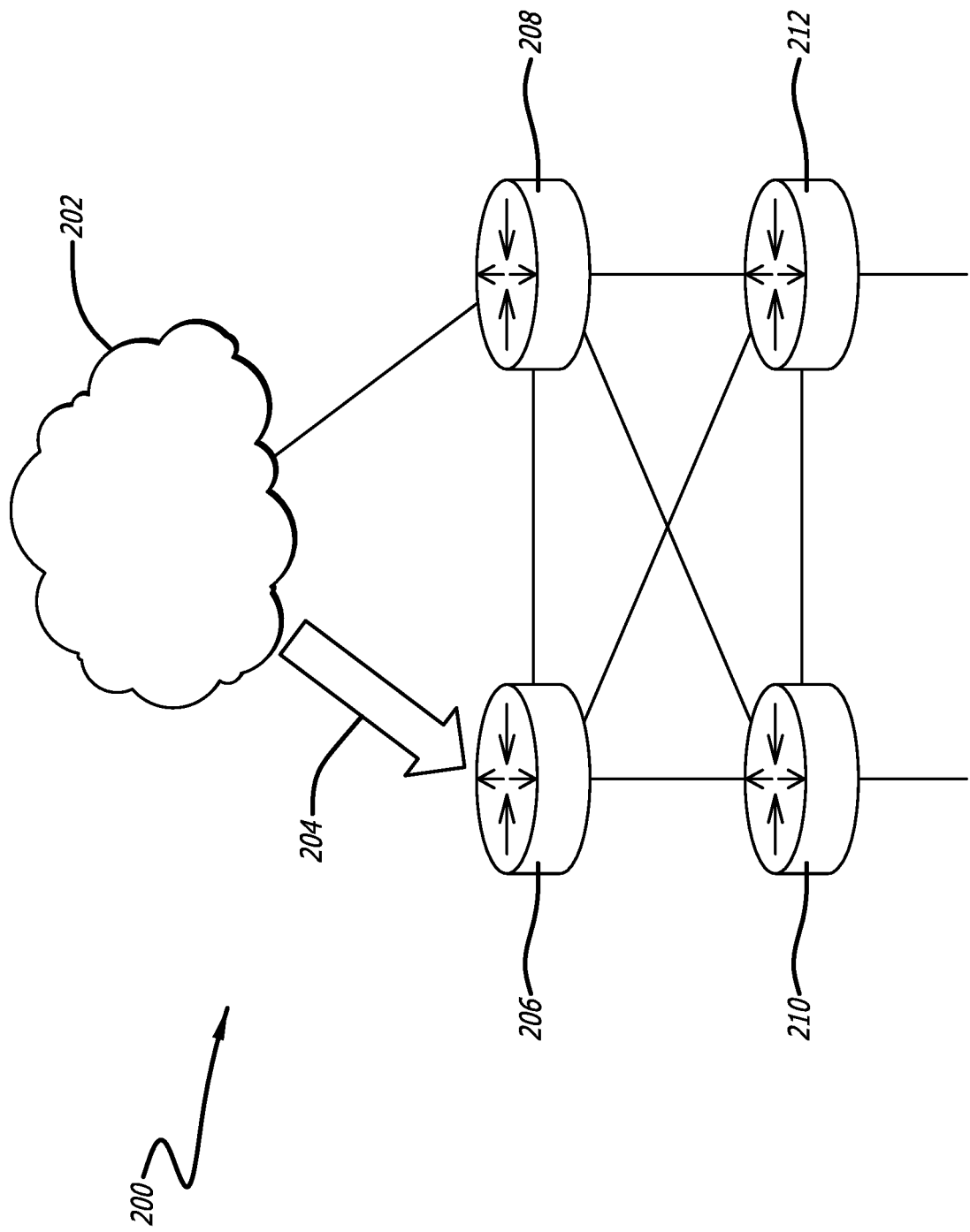
FIG. 2 is a diagram illustrating a network environment with interconnected network devices in accordance with various embodiments of the disclosure.

Referring to FIG. 2, a diagram illustrating a network environment 200 with interconnected network devices in accordance with various embodiments of the disclosure is shown. As shown, an external data source 202 (e.g., another site, the internet, etc.) may send a packet to a first network device 206 of a network at 204, where the first network device 206 can be an ingress network device for the network. The network includes a second network device 212, a third network device 210, and a fourth network device 208, as well, where the first network device 206, the second network device 212, the third network device 210, and the fourth network device 208 are neighbor network devices of each other. Each pair of network devices among the four network devices has a network path in between. The network may also include other devices that are not shown in the embodiment as depicted in FIG. 2.

In many embodiments, the packet sent to the first network device 206 at 204 may be associated with a flow. A number of features may need to be performed on the packet received by the first network device 206 (e.g., based on the flow with which the packet is associated). The four network devices shown in the embodiment as depicted in FIG. 2, including the first network device 206, may have power budget(s) for the processing of the packet (e.g., based on the flow with which the packet is associated), individually for each individual network device and/or in aggregate (e.g., for a number of network devices including the four network devices shown or for the entire network). In a number of embodiments, the first network device 206 may not be able to execute all features for the packet at itself (i.e., at the first network device 206) without exceeding the power budget(s). In a variety of embodiments, the power budget(s) associated with the packet can be an individual power budget for the first network device 206, the total power budget for a number of network devices including the four network devices, or the total power budget for the entire network, including the four network devices.

In more embodiments, the network devices (e.g., the four network devices shown in the embodiment as depicted in FIG. 2) can intelligently manage power consumption by cooperatively making end-to-end power consumption-based decisions on feature execution and allocation. In some embodiments, this can be achieved by allocating a predefined power budget for packet processing based on the criticality of the flow and/or the level of trust in the flow, and by determining which subsets of features can be run within the power budget(s) for specific flows. The network devices can also signal their capability to run features to their neighbors, based on their power consumption and adherence to the power budget(s), enabling intelligent and cooperative end-to-end power-based decision-making between devices.

Although a specific embodiment for a network environment with interconnected network devices suitable for carrying out the various steps, processes, methods, and operations described herein is discussed with respect to FIG. 2, any of a variety of systems and/or processes may be utilized in accordance with embodiments of the disclosure. For example, the network devices may utilize machine learning algorithms to dynamically adjust power budgets and feature execution based on real-time network conditions and traffic patterns. The elements depicted in FIG. 2 may also be interchangeable with other elements of FIGS. 1 and 3-10 as required to realize a particularly desired embodiment.

Figure 3:
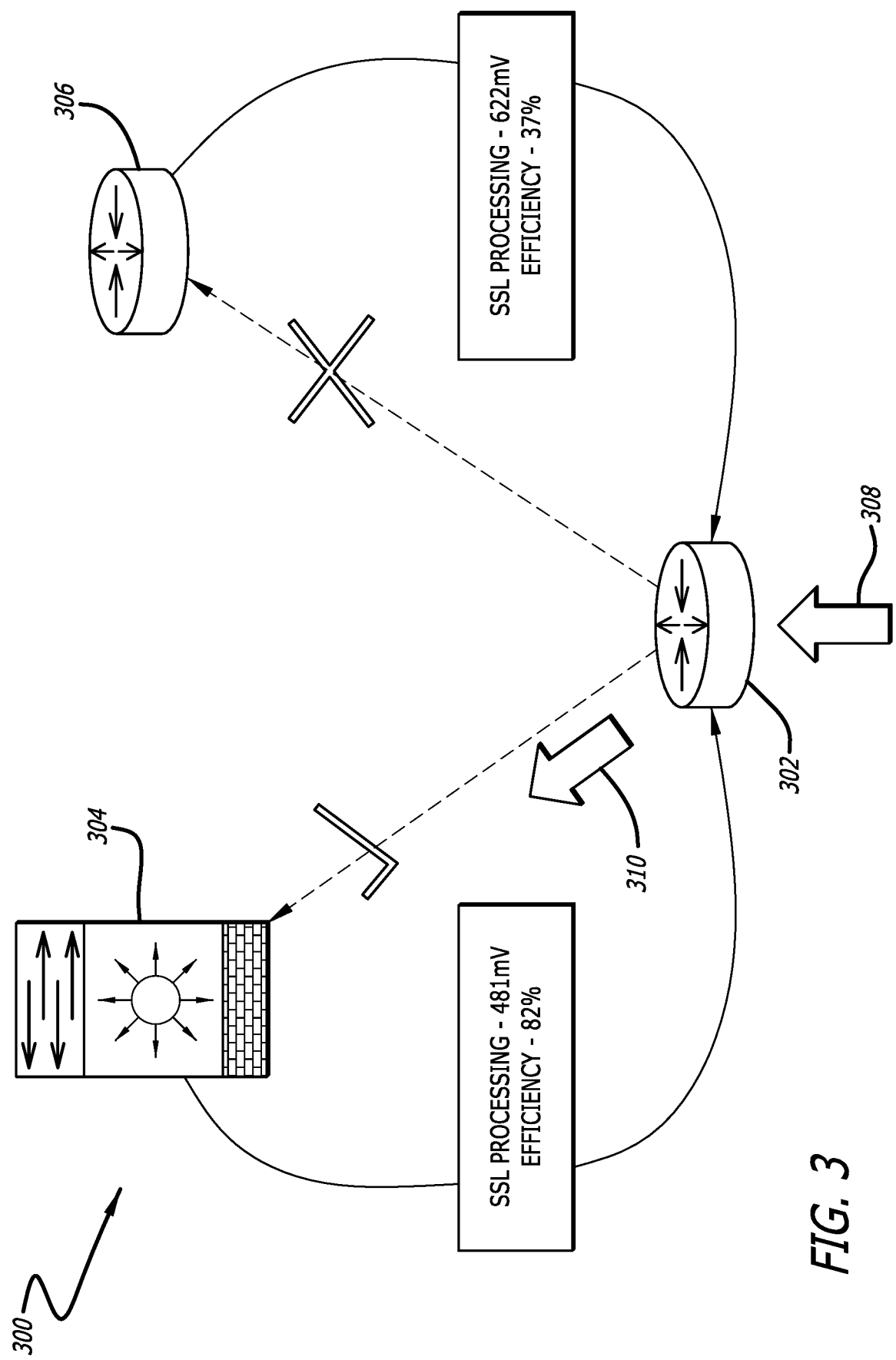
FIG. 3 is a diagram illustrating a network environment with interconnected network devices performing feature offloading in accordance with various embodiments of the disclosure.

Referring to FIG. 3, a diagram illustrating a network environment 300 with interconnected network devices performing feature offloading in accordance with various embodiments of the disclosure is shown. As shown, a first network device 302 may receive a packet at 308. The packet can be associated with power budget(s) for the network device(s) (e.g., based on a flow with which the packet is associated). Further, the packet may need secure sockets layer (SSL) processing. However, the first network device 302 may be unable to perform the SSL processing within the power budget(s).

In this scenario, the first network device 302 can identify two neighbor network devices: a second network device 304 and a third network device 306. The second network device 304 may be equipped with embedded SSL hardware, enabling it to perform hardware-based SSL processing. If the second network device 304 processes the SSL for the packet, a (predicted) sensor reading would be 481 mV, and the energy efficiency rating (metric) would be 82%. In contrast, the third network device 306 can just perform software-based SSL processing, resulting in a (predicted) sensor reading of 622 mV, which indicates higher power consumption than the second network device 304 for the same feature (SSL processing) for the packet. The energy efficiency rating for the third network device 306 for the feature is 37%, lower than the rating for the second network device 304.

In many embodiments, the first network device 302 may acquire capability data (e.g., capability data related to power consumption for SSL processing and/or associated energy efficiency metrics) from the second network device 304 and the third network device 306 (e.g., through the use of signaling via a metadata channel or a signaling channel). Based on the capability data, especially the lower power consumption and the higher efficiency rating at the second network device 304, the first network device 302 may decide to offload the SSL processing for the packet to the second network device 304 to remain within the power budget(s). Accordingly, at 310, the first network device 302 can forward the packet to the second network device 304 for SSL processing. In a number of embodiments, the first network device 302 may add route data (e.g., source route data) to the packet before forwarding the packet to the second network device 304. The route data may include the network path including the second network device 304 and an indication that the SSL processing is to be executed at the second network device 304. In numerous embodiments, the first network device 302 can place, inline in the packet itself, an indication of the SSL processing to be executed at the second network device 304.

Although a specific embodiment for a network environment with interconnected network devices performing feature offloading suitable for carrying out the various steps, processes, methods, and operations described herein is discussed with respect to FIG. 3, any of a variety of systems and/or processes may be utilized in accordance with embodiments of the disclosure. For example, the network devices may employ a distributed decision-making process to collaboratively determine the optimal offloading strategy for multiple features and multiple packets. The elements depicted in FIG. 3 may also be interchangeable with other elements of FIGS. 1, 2, and 4-10 as required to realize a particularly desired embodiment.

Figure 4:
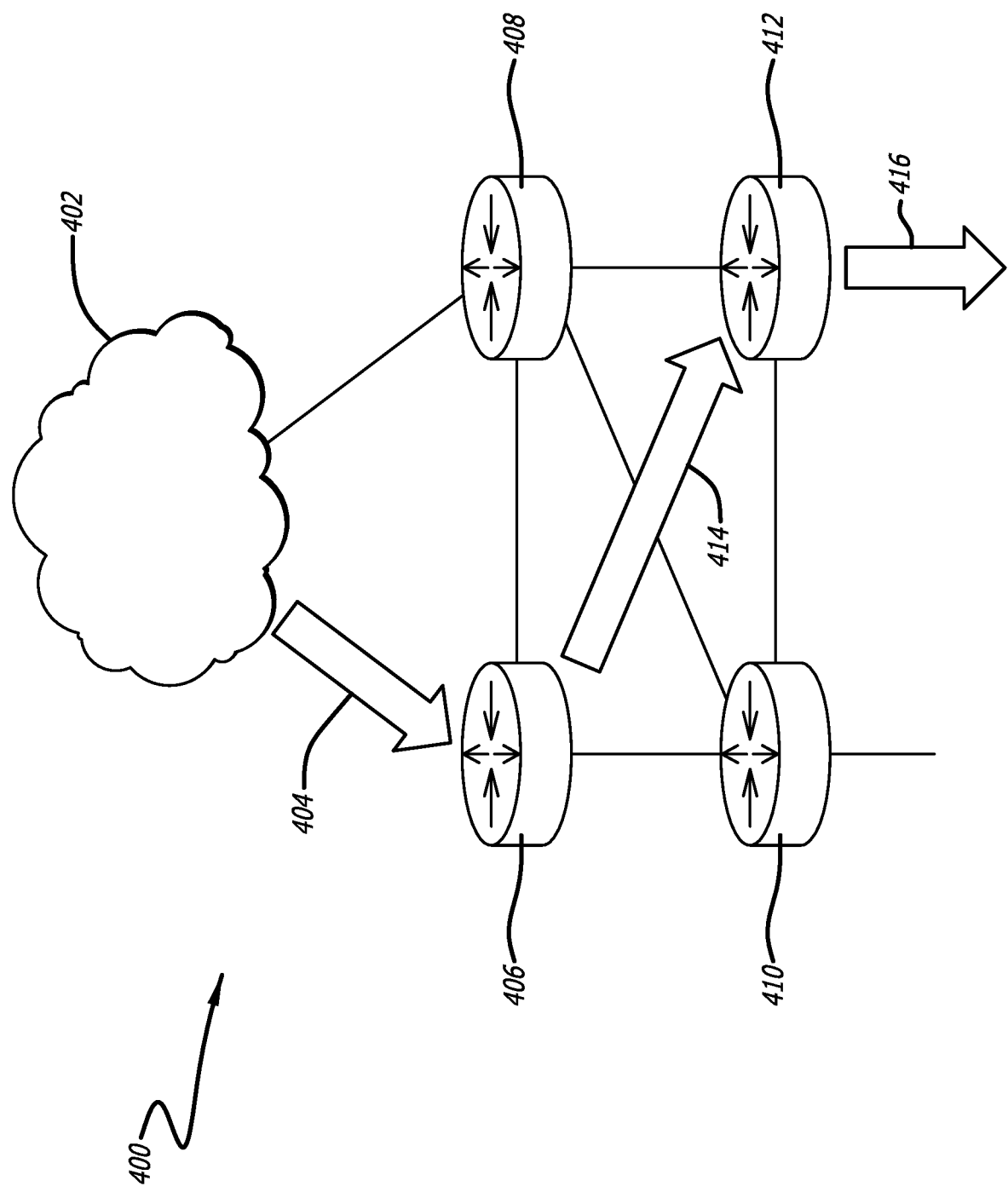
FIG. 4 is a diagram illustrating a network environment with interconnected network devices performing feature offloading and routing in accordance with various embodiments of the disclosure.

Referring to FIG. 4, a diagram illustrating a network environment 400 with interconnected network devices performing feature offloading and routing in accordance with various embodiments of the disclosure is shown. The network environment 400 may be similar to the network environment 200 shown in the embodiment as depicted in FIG. 2. In particular, the network environment 400 includes a data source 402, a first network device 406, a second network device 412, a third network device 410, and a fourth network device 408. The first network device 406, the second network device 412, the third network device 410, and the fourth network device 408 may be neighbor network devices of each other within the same network. The first network device 406 can receive a packet at 404 from the data source 402. The packet may be associated with one or more power budget(s) associated with its processing at the network devices of the network (e.g., based on the flow with which the packet is associated). In many embodiments, two features may need to be executed for the packet (e.g., for security screening). To stay within the power budget(s) for the packet, the first network device 406 can perform just the first feature but not the second feature for the packet.

Based on capability data received from the other three network devices, in a number of embodiments, the first network device 406 may decide to offload the second feature to the second network device 412. In a variety of embodiments, the first network device 406 can also decide to offload additional features to additional network devices not shown in the embodiment as depicted in FIG. 4. The first network device 406 may add route data to the packet. The route data can indicate a route through the second network device 412 and potentially through additional network devices. Moreover, the route data can specify that the second feature is to be executed at the second network device 412. In some embodiments, the route data may also specify that additional features are to be executed for the packet at the additional network devices. In numerous embodiments, the first network device 406 can place, inline in the packet itself, indications of features to be executed at (offloaded to) other network devices (e.g., the second feature to be executed at the second network device 412 and/or the additional features to be executed at the additional network devices).

At 414, the first network device 406 may forward the packet to the second network device 412. In more embodiments, upon receiving the packet, the second network device 412 can execute the second feature for the packet (e.g., based on the route data). Then, at 416, the second network device 412 may forward the packet to a next hop network device. In additional embodiments, the route data can have an indication of a path including additional network devices beyond the second network device 412, and the forwarding of the packet at 416 by the second network device 412 can be based on the route data. Accordingly, by offloading the second feature from the first network device 406 to the second network device 412, both features may be executed for the packet, while the power budget(s) associated with the packet (which can be individual power budgets for individual network devices, a total power budgets for a number of network devices including the four network devices shown in the embodiment as depicted in FIG. 4, or a total power budget for the entire network including the four network devices) may be adhered to by the network.

Although a specific embodiment for a network environment with interconnected network devices performing feature offloading and routing suitable for carrying out the various steps, processes, methods, and operations described herein is discussed with respect to FIG. 4, any of a variety of systems and/or processes may be utilized in accordance with embodiments of the disclosure. For example, the network devices may utilize machine learning algorithms to dynamically adapt their offloading strategies based on real-time network conditions and power consumption patterns. The elements depicted in FIG. 4 may also be interchangeable with other elements of FIGS. 1-3 and 5-10 as required to realize a particularly desired embodiment.

Figure 5:
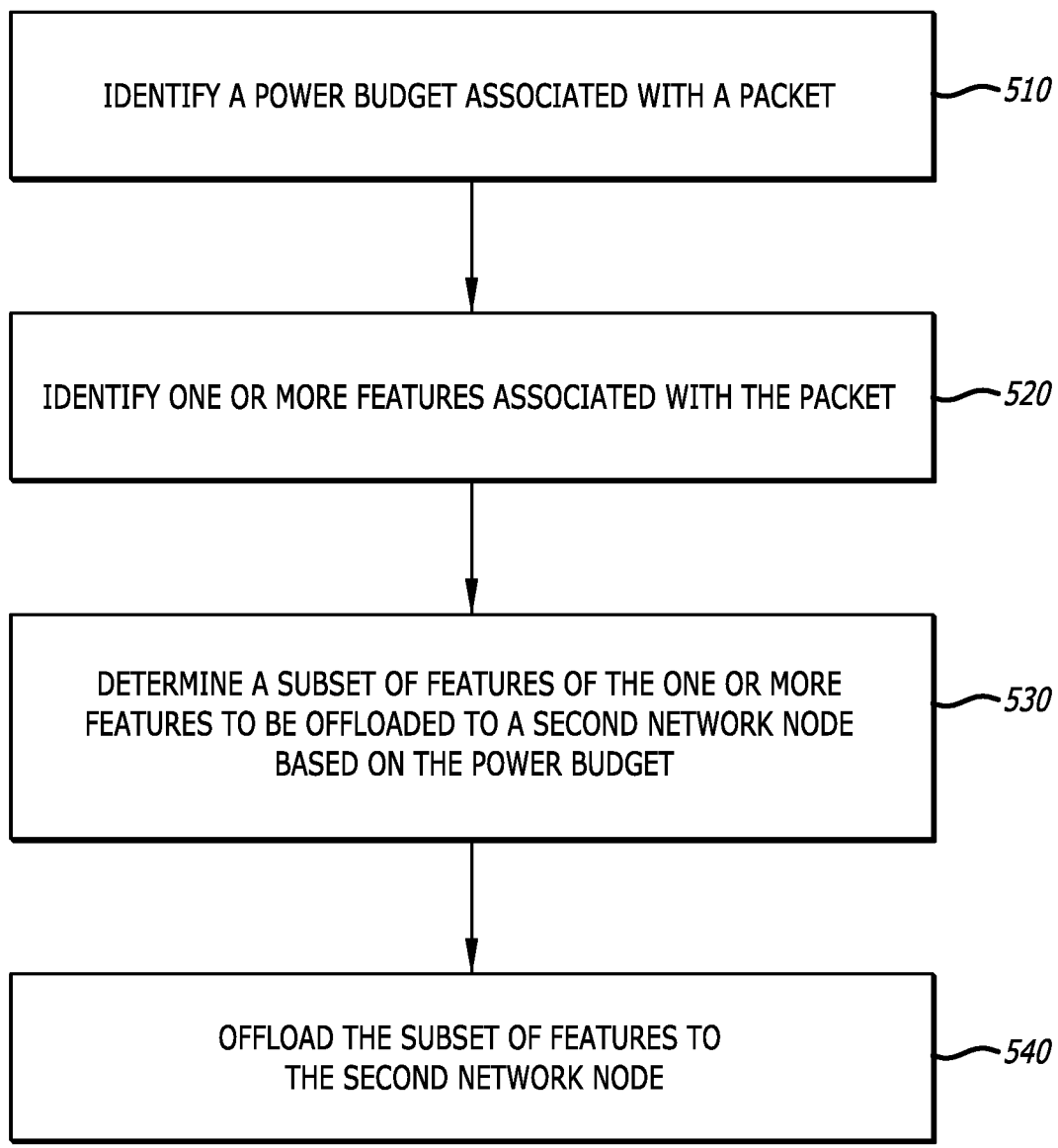
FIG. 5 is a flowchart showing a process for managing power consumption in a network environment by offloading features to a second network node in accordance with various embodiments of the disclosure.

Referring to FIG. 5, a flowchart showing a process 500 for managing power consumption in a network environment by offloading features to a second network node in accordance with various embodiments of the disclosure is shown. In many embodiments, the process 500 may identify a power budget associated with a packet (block 510). In a number of embodiments, the power budget can be determined on a per-network device basis or in aggregate. In a variety of embodiment, the power budget may also be influenced by the criticality of the flow with which the packet is associated and/or the level of trust in the flow.

In some embodiments, the process 500 may identify one or more features associated with the packet (block 520). The features can include, but are not limited to, ternary content-addressable memory (TCAM) filtering, virtual private network (VPN) decapsulation, or deep packet inspection (DPI). In more embodiments, the identified features may be prioritized based on their importance to the overall network functionality, security, or performance, allowing for more informed decisions when determining which features to offload.

In additional embodiments, the process 500 can determine a subset of features of the one or more features to be offloaded to a second network node based on the power budget (block 530). In further embodiments, the determination may be made using feature-to-power association data for the first network node (which may be generated using a feature-to-power machine learning model) and the power budget specification. In still more embodiments, the process may also consider the capabilities of the second network node and its power consumption profile.

In still further embodiments, the process 500 may offload the subset of features to the second network node (block 540). In still additional embodiments, to offload the subset of features, the process can add route data to the packet, which may include an indication of the subset of features to be executed by the second network node. The process can then forward the packet to the second network node, which can execute the offloaded features within the specified power budget.

Although a specific embodiment for a process for managing power consumption in a network environment by offloading features to a second network node suitable for carrying out the various steps, processes, methods, and operations described herein is discussed with respect to FIG. 5, any of a variety of systems and/or processes may be utilized in accordance with embodiments of the disclosure. For example, the process may incorporate real-time power consumption monitoring and dynamic adjustments to the power budget based on network traffic patterns and device capabilities. The elements depicted in FIG. 5 may also be interchangeable with other elements of FIGS. 1-4 and 6-10 as required to realize a particularly desired embodiment.

Figure 6:
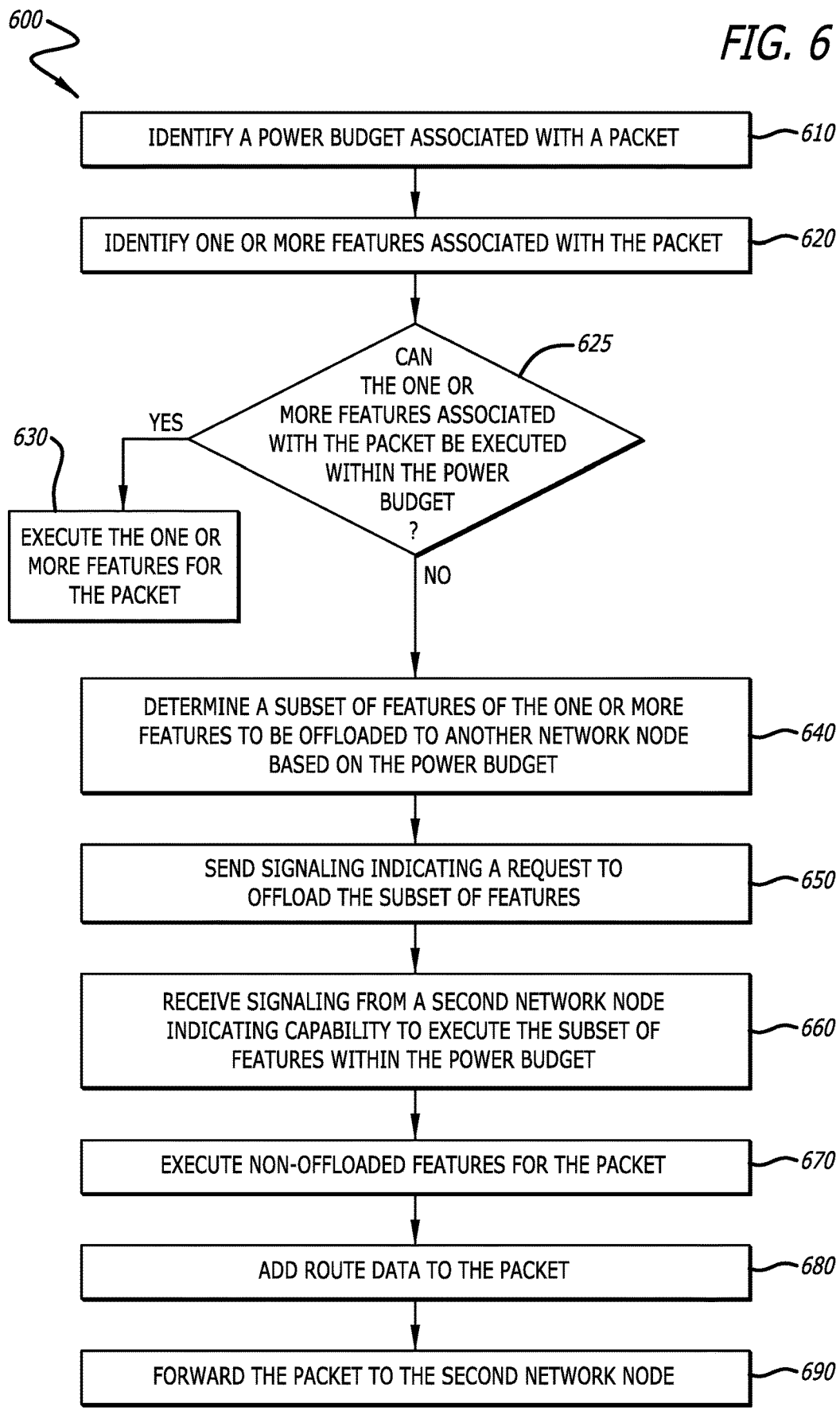
FIG. 6 is a flowchart showing a process for managing power consumption in a network environment by determining whether to offload features to another network node based on power budget constraints in accordance with various embodiments of the disclosure.

Referring to FIG. 6, a flowchart showing a process 600 for managing power consumption in a network environment by determining whether to offload features to another network node based on power budget constraints in accordance with various embodiments of the disclosure is shown. In many embodiments, the process 600 may identify a power budget associated with a packet (block 610). In a number of embodiments, this power budget can be determined on a per-network device basis or in aggregate. In a variety of embodiments, the power budget may also be influenced by the criticality of the flow with which the packet is associated and/or the level of trust in the flow.

In some embodiments, the process 600 may identify one or more features associated with the packet (block 620). The features can include, but are not limited to, TCAM filtering, VPN decapsulation, or DPI. In more embodiments, the identified features may be prioritized based on their importance to the overall network functionality, security, or performance.

In additional embodiments, the process 600 can determine if the one or more features associated with the packet can be executed within the power budget (block 625). In response to determining that the one or more features associated with packet can be executed within the power budget, the process 600 can execute the one or more features for the packet. However, if it is determined that the one or more features associated with packet cannot be executed within the power budget, the process 600 can determine a subset of features of the one or more features to be offloaded to another network node based on the power budget.

In further embodiments, the process 600 can execute the one or more features for the packet (block 630). This may allow the first network node to process the packet without offloading any features to other network nodes, while maintaining the desired level of power consumption. The execution of these features may be optimized to ensure efficient use of the available power budget.

In still more embodiments, the process 600 can determine a subset of features of the one or more features to be offloaded to another network node based on the power budget (block 640). In still further embodiments, the determination may be made using feature-to-power association data for the first network node and the power budget specification. The process may also consider the capabilities of other network nodes and their power consumption profiles to identify the most suitable node for offloading the subset of features.

In still further embodiments, the process 600 may send signaling indicating a request to offload the subset of features (block 650). In still additional embodiments, the signaling can be transmitted to a plurality of network nodes, including the second network node. In some more embodiments, the signaling may be conveyed via a metadata channel or a signaling channel, such as, but not limited to, a channel associated with the link state routing extensions.

In certain embodiments, the process 600 can receive signaling from a second network node indicating the capability to execute the subset of features within the power budget (block 660). In yet more embodiments, the signaling may include data about the current power draw and per-feature power consumption at the second network node. The signaling may also be conveyed via a metadata channel or a signaling channel.

In still yet more embodiments, the process 600 may execute non-offloaded features for the packet (block 670). This can allow the first network node to still contribute to the processing of the packet while adhering to the power budget constraints. The execution of non-offloaded features may be optimized based on the prioritization of the identified features.

In many further embodiments, the process 600 may add route data to the packet (block 680). In many additional embodiments, the route data can include an indication of the subset of features to be executed by the second network node. The route data may also specify a path through the network that optimizes power consumption and feature execution efficiency.

In still yet further embodiments, the process 600 may forward the packet to the second network node (block 690). In still yet additional embodiments, the second network node can then execute the offloaded features within the specified power budget. In several embodiments, the forwarding process may take into account the power consumption profiles of other network nodes along the path.

Although a specific embodiment for a process for managing power consumption in a network environment by determining whether to offload features to another network node based on power budget constraints suitable for carrying out the various steps, processes, methods, and operations described herein is discussed with respect to FIG. 6, any of a variety of systems and/or processes may be utilized in accordance with embodiments of the disclosure. For example, the process may incorporate adaptive power budget adjustments based on historical network traffic data and predicted future traffic patterns. The elements depicted in FIG. 6 may also be interchangeable with other elements of FIGS. 1-5 and 7-10 as required to realize a particularly desired embodiment.

Figure 7:
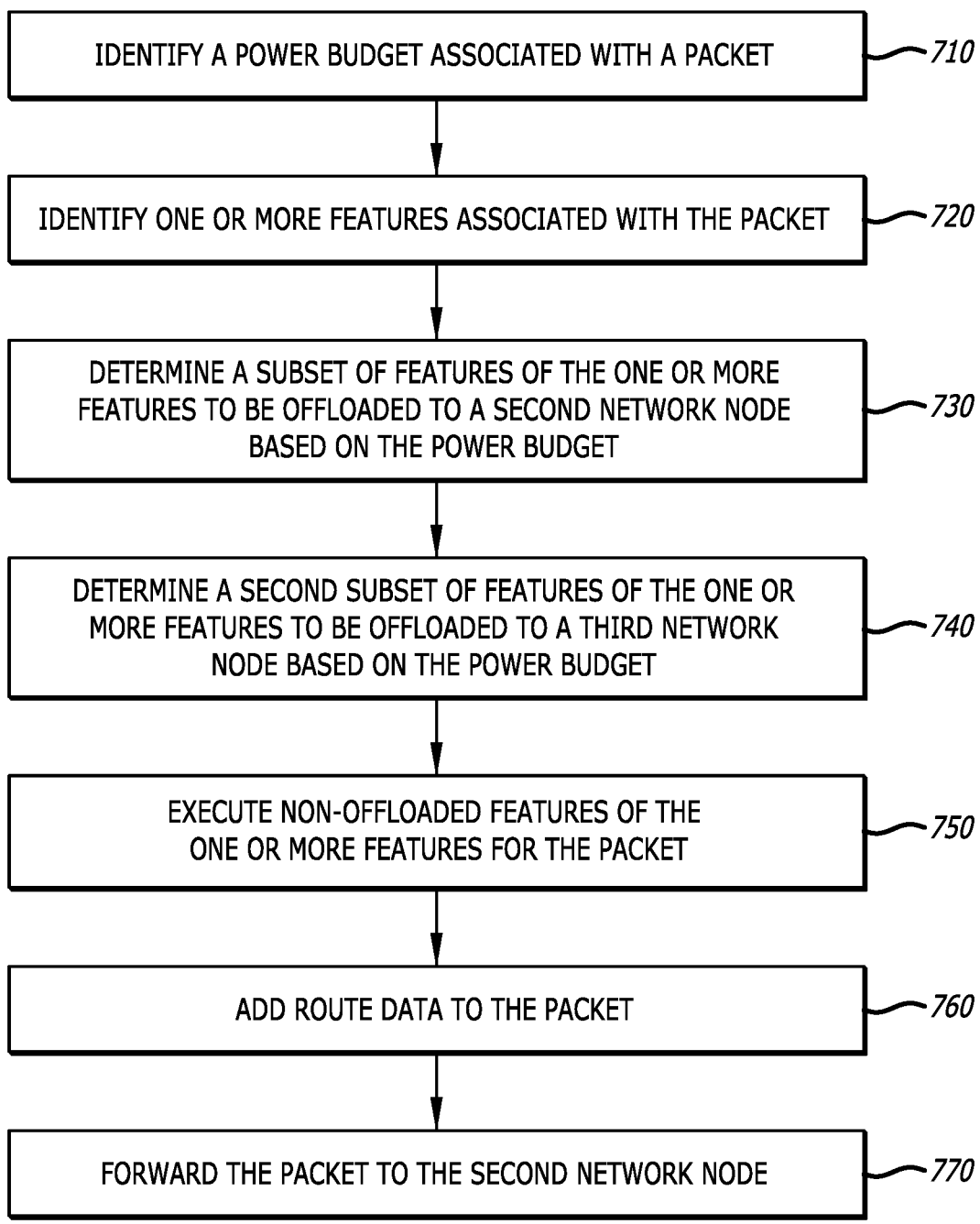
FIG. 7 is a flowchart showing a process for managing power consumption in a network environment by offloading features to multiple network nodes based on power budget constraints in accordance with various embodiments of the disclosure.

Referring to FIG. 7, a flowchart showing a process 700 for managing power consumption in a network environment by offloading features to multiple network nodes based on power budget constraints in accordance with various embodiments of the disclosure is shown. In many embodiments, the process 700 may identify a power budget associated with a packet (block 710). In a number of embodiments, the power budget can be determined on a per-network device basis or in aggregate. In a variety of embodiments, the power budget may also be influenced by the criticality of the flow with which the packet is associated and/or the level of trust in the flow.

In some embodiments, the process 700 may identify one or more features associated with the packet (block 720). In more embodiments, the features can include, but are not limited to, TCAM filtering, VPN decapsulation, or DPI. The identified features may be prioritized based on their importance to the overall network functionality, security, or performance.

In additional embodiments, the process 700 can determine a subset of features of the one or more features to be offloaded to a second network node based on the power budget (block 730). In further embodiments, the determination may be made using feature-to-power association data for the first network node and the power budget specification. The process may also consider the capabilities of the second network node and its power consumption profile.

In still more embodiments, the process 700 may determine a second subset of features of the one or more features to be offloaded to a third network node based on the power budget (block 740). In still further embodiments, the determination can be made using similar feature-to-power association data and power budget specifications. The process may also consider the capabilities of the third network node and its power consumption profile.

In still additional embodiments, the process 700 may execute non-offloaded features of the one or more features for the packet (block 750). In some more embodiments, this may allow the first network node to still contribute to the processing of the packet while adhering to the power budget constraints. The execution of non-offloaded features may be optimized based on the prioritization of the identified features.

In certain embodiments, the process 700 may add route data to the packet (block 760). In yet more embodiments, the route data can include an indication of the subsets of features to be executed by the second and third network nodes. In still yet more embodiments, the route data may also specify a path through the network that optimizes power consumption and feature execution efficiency, where the path can include the second and third network nodes.

In many further embodiments, the process 700 may forward the packet to the second network node (block 770). In many additional embodiments, the second network node can then execute the offloaded features within the specified power budget. The second network node can subsequently forward the packet to the third network node for further processing.

Although a specific embodiment for a process for managing power consumption in a network environment by offloading features to multiple network nodes based on power budget constraints suitable for carrying out the various steps, processes, methods, and operations described herein is discussed with respect to FIG. 7, any of a variety of systems and/or processes may be utilized in accordance with embodiments of the disclosure. For example, the process may incorporate a machine learning algorithm to predict the optimal distribution of features across multiple network nodes based on historical network traffic data, power consumption profiles, and device capabilities. The elements depicted in FIG. 7 may also be interchangeable with other elements of FIGS. 1-6 and 8-10 as required to realize a particularly desired embodiment.

Figure 8:
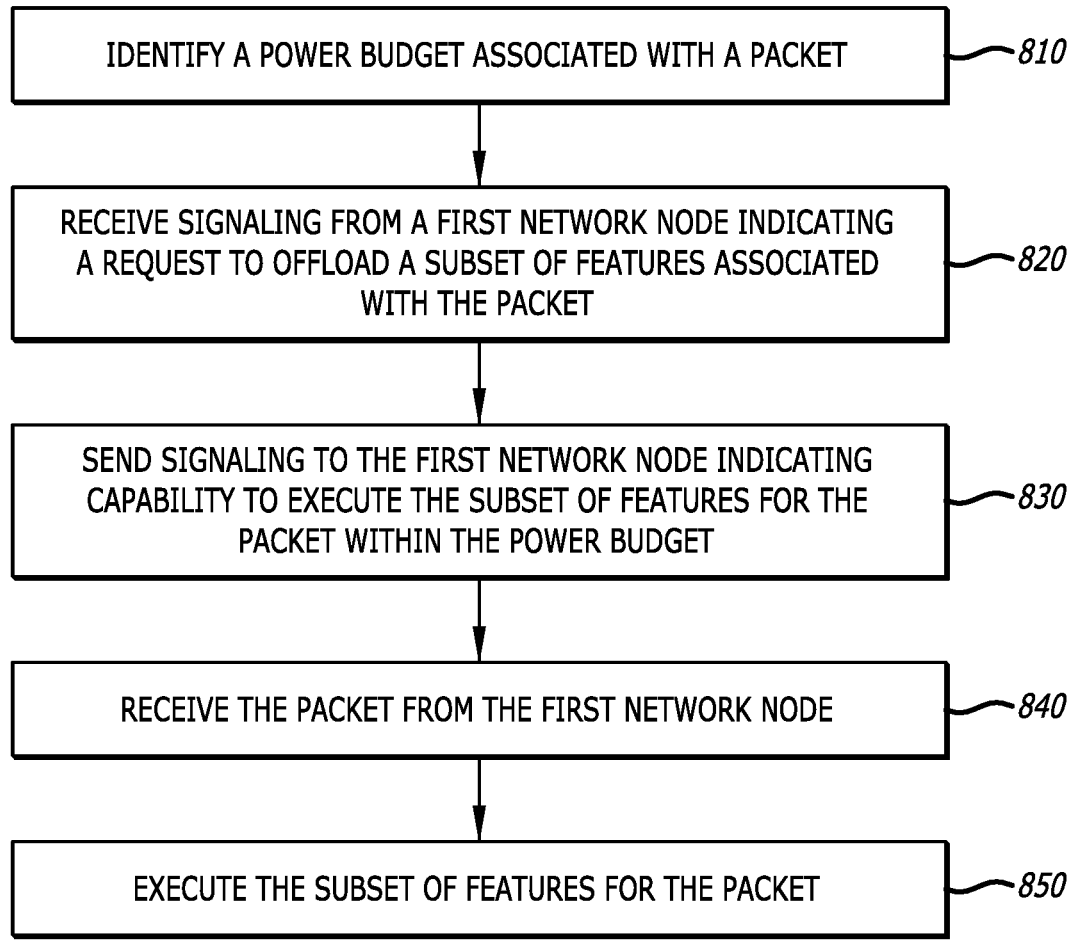
FIG. 8 is a flowchart showing a process for managing power consumption in a network environment by accepting and executing offloaded features from a first network node based on power budget constraints in accordance with various embodiments of the disclosure.

Referring to FIG. 8, a flowchart showing a process 800 for managing power consumption in a network environment by accepting and executing offloaded features from a first network node based on power budget constraints in accordance with various embodiments of the disclosure is shown. In many embodiments, the process 800 may identify a power budget associated with a packet (block 810). In a number of embodiments, the power budget can be determined on a per-network device basis or in aggregate. In a variety of embodiments, the power budget may also be influenced by the criticality of the flow with which the packet is associated and/or the level of trust in the flow.

In some embodiments, the process 800 may receive signaling from a first network node indicating a request to offload a subset of features associated with the packet (block 820). The signaling can be transmitted from the first network node, which has determined that it cannot execute the subset of features within the power budget(s). In more embodiments, the signaling may be conveyed via a metadata channel or a signaling channel, such as, but not limited to, a channel associated with link state routing extensions.

In additional embodiments, the process 800 can send signaling to the first network node indicating the capability to execute the subset of features for the packet within the power budget (block 830). In further embodiments, the signaling may include data about the current power draw and per-feature power consumption at the second network node. In still more embodiments, the signaling may also be conveyed via a metadata channel or a signaling channel.

In still further embodiments, the process 800 may receive the packet from the first network node (block 840). In still additional embodiments, the packet may include route data added by the first network node, which can indicate the subset of features to be executed by the second network node. In some more embodiments, upon receiving the packet, the second network node may verify the integrity and authenticity of the packet to ensure that it has not been tampered with or altered during transmission from the first network node.

In certain embodiments, the process 800 may execute the subset of features for the packet (block 850). In yet more embodiments, this may allow the second network node to contribute to the processing of the packet while adhering to the power budget constraints. The execution of the offloaded features may be optimized based on the prioritization of the identified features and the capabilities of the second network node.

Although a specific embodiment for a process for managing power consumption in a network environment by receiving and executing offloaded features from a first network node based on power budget constraints suitable for carrying out the various steps, processes, methods, and operations described herein is discussed with respect to FIG. 8, any of a variety of systems and/or processes may be utilized in accordance with embodiments of the disclosure. For example, the process may incorporate a feedback mechanism between the first and second network nodes to dynamically adjust the distribution of features based on changing network conditions and power consumption profiles. The elements depicted in FIG. 8 may also be interchangeable with other elements of FIGS. 1-7, 9, and 10 as required to realize a particularly desired embodiment.

Figure 9:
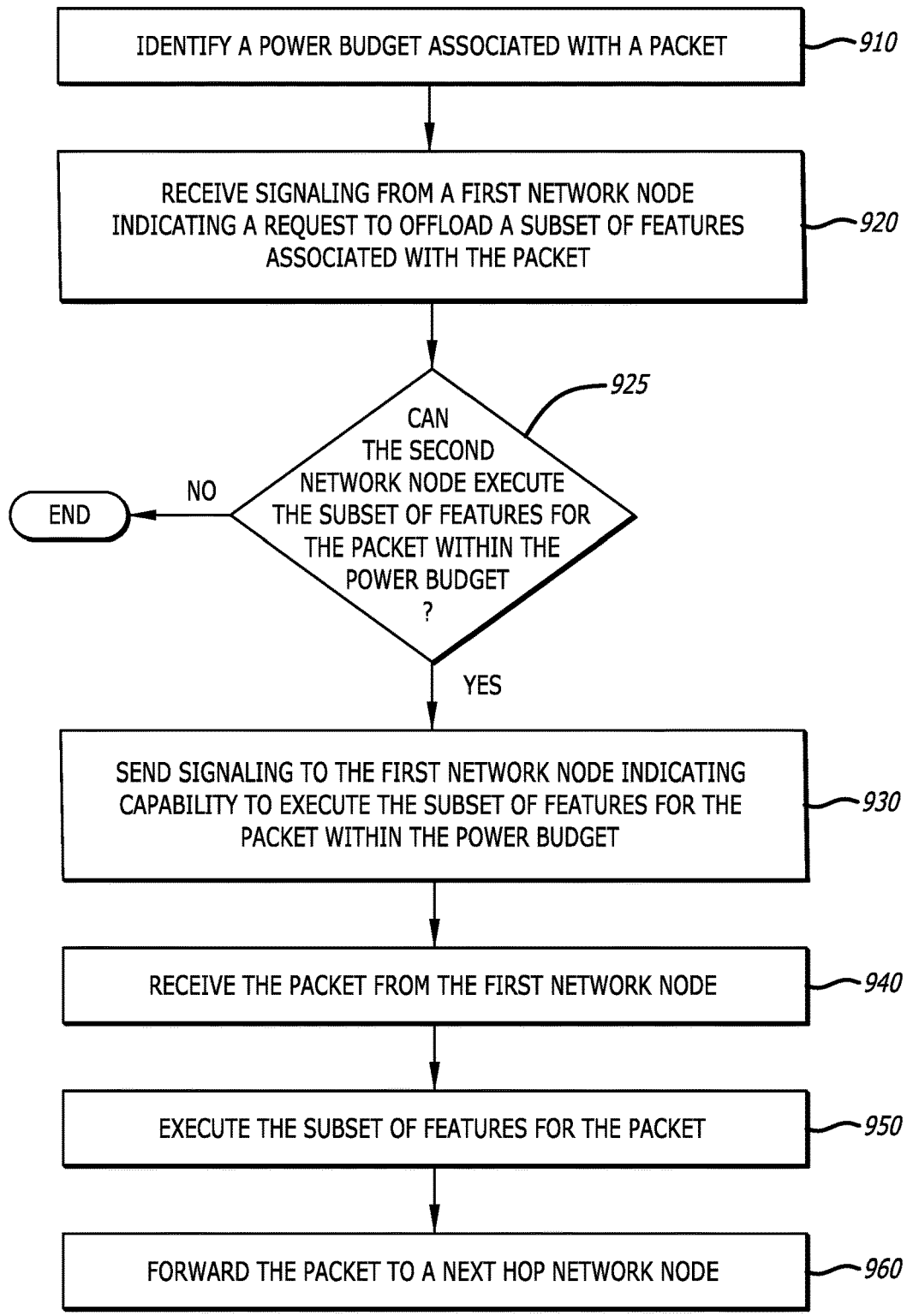
FIG. 9 is a flowchart showing a process for managing power consumption in a network environment by determining the capability to execute offloaded features from a first network node based on power budget constraints in accordance with various embodiments of the disclosure.

Referring to FIG. 9, a flowchart showing a process 900 for managing power consumption in a network environment by determining the capability to execute offloaded features from a first network node based on power budget constraints in accordance with various embodiments of the disclosure is shown. In many embodiments, the process 900 may identify a power budget associated with a packet (block 910). In a number of embodiments, the power budget can be determined on a per-network device basis or in aggregate. In a variety of embodiments, the power budget may also be influenced by the criticality of the flow with which the packet is associated and/or the level of trust in the flow.

In some embodiments, the process 900 may receive signaling from a first network node indicating a request to offload a subset of features associated with the packet (block 920). The signaling can be transmitted from the first network node, which has determined that it cannot execute the subset of features within its power budget. In more embodiments, the signaling may be conveyed via a metadata channel or a signaling channel, such as, but not limited to, a channel associated with the link state routing extensions.

In additional embodiments, the process 900 can determine if the second network node can execute the subset of features for the packet within the power budget (block 925). In response to determining that the second network node can execute the subset of features for the packet within the power budget, the process 900 can send signaling to the first network node indicating the capability to execute the subset of features for the packet within the power budget. However, if it is determined that the second network node cannot execute the subset of features for the packet within the power budget, the process 900 can end, and the second network node will not participate in the offloading process.

In further embodiments, the process 900 may send signaling to the first network node indicating the capability to execute the subset of features for the packet within the power budget (block 930). In still more embodiments, the signaling may include data about the current power draw and per-feature power consumption at the second network node. In still further embodiments, the signaling may also be conveyed via a metadata channel or a signaling channel.

In still additional embodiments, the process 900 may receive the packet from the first network node (block 940). In some more embodiments, the packet may include route data added by the first network node, which can indicate the subset of features to be executed by the second network node. In certain embodiments, upon receiving the packet, the second network node may verify the integrity and authenticity of the packet to ensure that it has not been tampered with or altered during transmission from the first network node.

In yet more embodiments, the process 900 may execute the subset of features for the packet (block 950). In still yet more embodiments, this may allow the second network node to contribute to the processing of the packet while adhering to the power budget constraints. The execution of the offloaded features may be optimized based on the prioritization of the identified features and the capabilities of the second network node.

In many further embodiments, the process 900 may forward the packet to a next hop network node (block 960). In many additional embodiments, the next hop network node can continue processing the packet, potentially offloading additional features, based on power budget constraints and network conditions. In still yet further embodiments, the packet may be forwarded to the next hop network node based on the route data added to the packet by the first network node.

Although a specific embodiment for a process for managing power consumption in a network environment by determining the capability to execute offloaded features from a first network node based on power budget constraints suitable for carrying out the various steps, processes, methods, and operations described herein is discussed with respect to FIG. 9, any of a variety of systems and/or processes may be utilized in accordance with embodiments of the disclosure. For example, in some embodiments, the process may incorporate a distributed power management system that enables network nodes to collaboratively optimize power consumption and feature execution across the entire network. The elements depicted in FIG. 9 may also be interchangeable with other elements of FIGS. 1-8 and 10 as required to realize a particularly desired embodiment.

Figure 10:
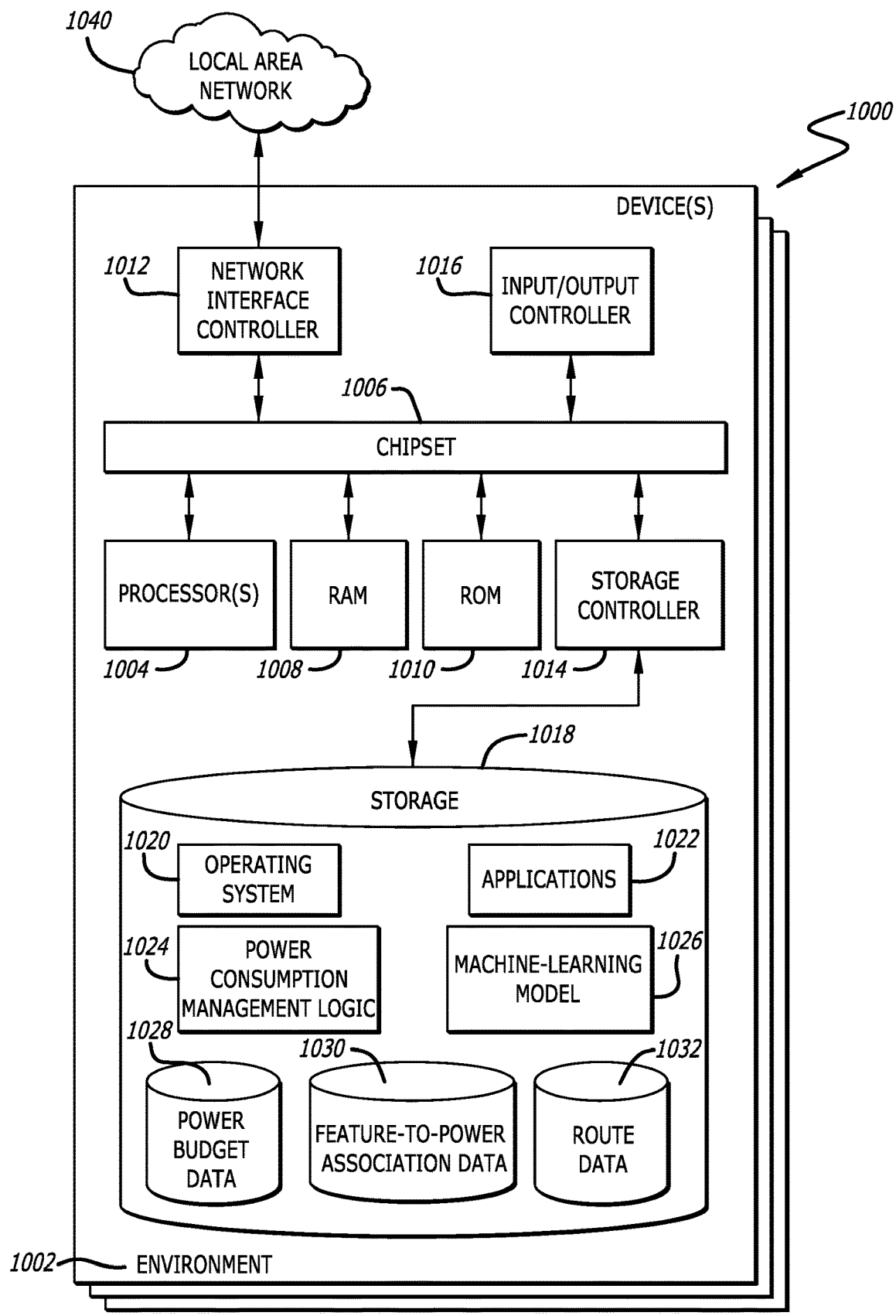
FIG. 10 is a conceptual block diagram for one or more devices capable of executing components and logic for implementing the functionality and embodiments described above.

Referring to FIG. 10, a conceptual block diagram for one or more devices 1000 capable of executing components and logic for implementing the functionality and embodiments described above is shown. The embodiment of the conceptual block diagram depicted in FIG. 10 can illustrate a conventional server computer, workstation, desktop computer, laptop, tablet, network appliance, e-reader, smartphone, or other computing device, and can be utilized to execute any of the application and/or logic components presented herein. The device 1000 may, in some examples, correspond to physical devices or to virtual resources described herein.

In many embodiments, the device 1000 may include an environment 1002 such as a baseboard or "motherboard," in physical embodiments that can be configured as a printed circuit board with a multitude of components or devices connected by way of a system bus or other electrical communication paths. Conceptually, in virtualized embodiments, the environment 1002 may be a virtual environment that encompasses and executes the remaining components and resources of the device 1000. In more embodiments, one or more processors 1004, such as, but not limited to, central processing units ("CPUs") can be configured to operate in conjunction with a chipset 1006. The processor(s) 1004 can be standard programmable CPUs that perform arithmetic and logical operations necessary for the operation of the device 1000.

In additional embodiments, the processor(s) 1004 can perform one or more operations by transitioning from one discrete, physical state to the next through the manipulation of switching elements that differentiate between and change these states. Switching elements generally include electronic circuits that maintain one of two binary states, such as flip-flops, and electronic circuits that provide an output state based on the logical combination of the states of one or more other switching elements, such as logic gates. These basic switching elements can be combined to create more complex logic circuits, including registers, adders-subtractors, arithmetic logic units, floating-point units, and the like.

In certain embodiments, the chipset 1006 may provide an interface between the processor(s) 1004 and the remainder of the components and devices within the environment 1002. The chipset 1006 can provide an interface to a random-access memory ("RAM") 1008, which can be used as the main memory in the device 1000 in some embodiments. The chipset 1006 can further be configured to provide an interface to a computer-readable storage medium such as a read-only memory ("ROM") 1010 or non-volatile RAM ("NVRAM") for storing basic routines that can help with various tasks such as, but not limited to, starting up the device 1000 and/or transferring information between the various components and devices. The ROM 1010 or NVRAM can also store other application components necessary for the operation of the device 1000 in accordance with various embodiments described herein.

Different embodiments of the device 1000 can be configured to operate in a networked environment using logical connections to remote computing devices and computer systems through a network, such as the network 1040. The chipset 1006 can include functionality for providing network connectivity through a network interface controller ("NIC") 1012, which may comprise a gigabit Ethernet adapter or similar component. The NIC 1012 can be capable of connecting the device 1000 to other devices over the network 1040. It is contemplated that multiple NICs 1012 may be present in the device 1000, connecting the device to other types of networks and remote systems.

In further embodiments, the device 1000 can be connected to a storage 1018 that provides non-volatile storage for data accessible by the device 1000. The storage 1018 can, for example, store an operating system 1020, applications 1022, power budget data 1028, feature-to-power association data 1030, and route data 1032, which are described in greater detail below. The storage 1018 can be connected to the environment 1002 through a storage controller 1014 connected to the chipset 1006. In certain embodiments, the storage 1018 can consist of one or more physical storage units. The storage controller 1014 can interface with the physical storage units through a serial attached SCSI ("SAS") interface, a serial advanced technology attachment ("SATA") interface, a fiber channel ("FC") interface, or other type of interface for physically connecting and transferring data between computers and physical storage units.

The device 1000 can store data within the storage 1018 by transforming the physical state of the physical storage units to reflect the information being stored. The specific transformation of physical state can depend on various factors. Examples of such factors can include, but are not limited to, the technology used to implement the physical storage units, whether the storage 1018 is characterized as primary or secondary storage, and the like.

For example, the device 1000 can store information within the storage 1018 by issuing instructions through the storage controller 1014 to alter the magnetic characteristics of a particular location within a magnetic disk drive unit, the reflective or refractive characteristics of a particular location in an optical storage unit, or the electrical characteristics of a particular capacitor, transistor, or other discrete component in a solid-state storage unit, or the like. Other transformations of physical media are possible without departing from the scope and spirit of the present description, with the foregoing examples provided only to facilitate this description. The device 1000 can further read or access information from the storage 1018 by detecting the physical states or characteristics of one or more particular locations within the physical storage units.

In addition to the storage 1018 described above, the device 1000 can have access to other computer-readable storage media to store and retrieve information, such as program modules, data structures, or other data. It should be appreciated by those skilled in the art that computer-readable storage media is any available media that provides for the non-transitory storage of data and that can be accessed by the device 1000. In some examples, the operations performed by a cloud computing network, and or any components included therein, may be supported by one or more devices similar to device 1000. Stated otherwise, some or all of the operations performed by the cloud computing network, and or any components included therein, may be performed by one or more devices 1000 operating in a cloud-based arrangement.

By way of example, and not limitation, computer-readable storage media can include volatile and non-volatile, removable, and non-removable media implemented in any method or technology. Computer-readable storage media includes, but is not limited to, RAM, ROM, erasable programmable ROM ("EPROM"), electrically-erasable programmable ROM ("EEPROM"), flash memory or other solid-state memory technology, compact disc ROM ("CD-ROM"), digital versatile disk ("DVD"), high definition DVD ("HD-DVD"), BLU-RAY, or other optical storage, magnetic cassettes, magnetic tape, magnetic disk storage or other magnetic storage devices, or any other medium that can be used to store the desired information in a non-transitory fashion.

As mentioned briefly above, the storage 1018 can store an operating system 1020 utilized to control the operation of the device 1000. According to one embodiment, the operating system comprises the LINUX operating system. According to another embodiment, the operating system comprises the WINDOWS® SERVER operating system from MICROSOFT Corporation of Redmond, Washington. According to further embodiments, the operating system can comprise the UNIX operating system or one of its variants. It should be appreciated that other operating systems can also be utilized. The storage 1018 can store other system or application programs and data utilized by the device 1000.

In various embodiment, the storage 1018 or other computer-readable storage media is encoded with computer-executable instructions which, when loaded into the device 1000, may transform it from a general-purpose computing system into a special-purpose computer capable of implementing the embodiments described herein. These computer-executable instructions may be stored as application 1022 and transform the device 1000 by specifying how the processor(s) 1004 can transition between states, as described above. In some embodiments, the device 1000 has access to computer-readable storage media storing computer-executable instructions which, when executed by the device 1000, perform the various processes described above with regard to FIGS. 1-9. In more embodiments, the device 1000 can also include computer-readable storage media having instructions stored thereupon for performing any of the other computer-implemented operations described herein.

In still further embodiments, the device 1000 can also include one or more input/output controllers 1016 for receiving and processing input from a number of input devices, such as a keyboard, a mouse, a touchpad, a touch screen, an electronic stylus, or other type of input device. Similarly, an input/output controller 1016 can be configured to provide output to a display, such as a computer monitor, a flat panel display, a digital projector, a printer, or other type of output device. Those skilled in the art will recognize that the device 1000 might not include all of the components shown in FIG. 10, and can include other components that are not explicitly shown in FIG. 10, or might utilize an architecture completely different than that shown in FIG. 10.

As described above, the device 1000 may support a virtualization layer, such as one or more virtual resources executing on the device 1000. In some examples, the virtualization layer may be supported by a hypervisor that provides one or more virtual machines running on the device 1000 to perform functions described herein. The virtualization layer may generally support a virtual resource that performs at least a portion of the techniques described herein.

In many embodiments, the device 1000 can include a power consumption management logic 1024. The power consumption management logic 1024 may facilitate the offloading of features to other network nodes, optimizing power consumption and feature execution efficiency across the network. The power consumption management logic 1024 can dynamically adjust the power budget(s) associated with a packet based on real-time network conditions and device capabilities.

In a number of embodiments, the storage 1018 can include power budget data 1028. The power budget data 1028 can provide the power consumption limits associated with a packet for a specific network node or the entire network. The power budget data 1028 may be dynamically updated based on real-time network conditions, device capabilities, and the criticality of the flow or level of trust in the flow, ensuring efficient power management across the network.

In various embodiments, the storage 1018 can include feature-to-power association data 1030. The feature-to-power association data 1030 can indicate the power consumption of individual features associated with a packet, such as, but not limited to, filtering, decapsulation, or DPI. The feature-to-power association data 1030 can be derived from a feature-to-power machine learning model. The feature-to-power association data 1030 may be utilized by the power consumption management logic 1024 to determine the optimal distribution of features across multiple network nodes, ensuring efficient power management while maintaining the desired level of network functionality, security, and performance.

In still more embodiments, the storage 1018 can include route data 1032. The route data 1032 can indicate the path a packet may take through the network, including indications of the subsets of features to be executed by specific network nodes. The route data 1032 may be dynamically updated based on power budget constraints, network conditions, and device capabilities, ensuring that the packet is routed efficiently while adhering to the power consumption limits of the entire network.

Finally, in many embodiments, data may be processed into a format usable by a machine-learning model 1026 (e.g., feature vectors), and or other pre-processing techniques. The machine-learning ("ML") model 1026 may be any type of ML model, such as supervised models, reinforcement models, and/or unsupervised models. The ML model 1026 may include one or more of linear regression models, logistic regression models, decision trees, Naïve Bayes models, neural networks, k-means cluster models, random forest models, and/or other types of ML models 1026. The ML model 1026 may be configured to predict the optimal distribution of features across multiple network nodes based on historical network traffic data, power consumption profiles, and device capabilities. The ML model 1026 may continuously learn and adapt to changing network conditions, enabling more efficient power management and feature execution across the entire network.

Although the present disclosure has been described in certain specific aspects, many additional modifications and variations would be apparent to those skilled in the art. In particular, any of the various processes described above can be performed in alternative sequences and/or in parallel (on the same or on different computing devices) in order to achieve similar results in a manner that is more appropriate to the requirements of a specific application. It is therefore to be understood that the present disclosure can be practiced other than specifically described without departing from the scope and spirit of the present disclosure. Thus, embodiments of the present disclosure should be considered in all respects as illustrative and not restrictive. It will be evident to the person skilled in the art to freely combine several or all of the embodiments discussed here as deemed suitable for a specific application of the disclosure. Throughout this disclosure, terms like "advantageous", "exemplary" or "example" indicate elements or dimensions which are particularly suitable (but not essential) to the disclosure or an embodiment thereof and may be modified wherever deemed suitable by the skilled person, except where expressly required. Accordingly, the scope of the disclosure should be determined not by the embodiments illustrated, but by the appended claims and their equivalents.

Any reference to an element being made in the singular is not intended to mean "one and only one" unless explicitly so stated, but rather "one or more." All structural and functional equivalents to the elements of the above-described preferred embodiment and additional embodiments as regarded by those of ordinary skill in the art are hereby expressly incorporated by reference and are intended to be encompassed by the present claims.

Moreover, no requirement exists for a system or method to address each and every problem sought to be resolved by the present disclosure, for solutions to such problems to be encompassed by the present claims. Furthermore, no element, component, or method step in the present disclosure is intended to be dedicated to the public regardless of whether the element, component, or method step is explicitly recited in the claims. Various changes and modifications in form, material, workpiece, and fabrication material detail can be made, without departing from the spirit and scope of the present disclosure, as set forth in the appended claims, as might be apparent to those of ordinary skill in the art, are also encompassed by the present disclosure.

The invention claimed is:

1. A first network node, comprising:
    a processor;
    at least one network interface controller configured to provide access to a network; and
    a memory communicatively coupled to the processor, wherein the memory comprises a power consumption management logic that is configured to:
        identify at least one power budget specification associated with a packet;
        identify one or more features associated with the packet;
        determine a subset of features of the one or more features to be offloaded to a second network node based on the at least one power budget specification associated with the packet; and
        offload the subset of features to the second network node.

2. The first network node of claim 1, wherein the subset of features to be offloaded to the second network node is determined based on feature-to-power association data for the first network node and the at least one power budget specification.

3. The first network node of claim 1, wherein to determine the subset of features to be offloaded to the second network node, the power consumption management logic is further configured to:
    transmit first signaling to a plurality of network nodes including the second network node indicating a request to offload the subset of features; and
    receive second signaling from the second network node indicating a capability of the second network node to execute the subset of features for the packet within the at least one power budget specification.

4. The first network node of claim 3, wherein at least one of the first signaling or the second signaling is conveyed via a metadata channel or a signaling channel.

5. The first network node of claim 3, wherein the second signaling comprises an indication of a current power draw of the second network node.

6. The first network node of claim 3, wherein the second signaling comprises an indication of a per-feature power consumption at the second network node for at least one feature in the subset of features.

7. The first network node of claim 1, wherein to offload the subset of features to the second network node, the power consumption management logic is further configured to:
    add route data to the packet, the route data including an indication of the subset of features to be executed by the second network node; and
    forward the packet to the second network node.

8. The first network node of claim 1, wherein the at least one power budget specification includes respective power budget specifications for each of the first network node and the second network node.

9. The first network node of claim 1, wherein the at least one power budget specification includes a total power budget specification in aggregate for a set of network nodes including the first network node and the second network node.

10. The first network node of claim 1, wherein to determine the subset of features to be offloaded to the second network node, the power consumption management logic is further configured to:
    select a path for the packet based on the at least one power budget specification associated with the packet, the path including the second network node and a third network node;
    determine a second subset of features of the one or more features to be offloaded to the third network node based on the at least one power budget specification associated with the packet;
    offload the second subset of features to the third network node; and
    execute one or more non-offloaded features of the one or more features for the packet.

11. The first network node of claim 1, wherein the one or more features include at least one of ternary content-addressable memory (TCAM) filtering, virtual private network (VPN) decapsulation, or deep packet inspection (DPI).

12. The first network node of claim 1, wherein the first network node comprises at least one of a router, a switch, or a line card.

13. A second network node, comprising:
    a processor;
    at least one network interface controller configured to provide access to a network; and
    a memory communicatively coupled to the processor, wherein the memory comprises a power consumption management logic that is configured to:
        identify at least one power budget specification associated with a packet;

receive first signaling from a first network node indicating a request to offload a subset of features for the packet;

transmit second signaling from to the first network node indicating a capability of the second network node to execute the subset of features for the packet within the at least one power budget specification;

receive the packet from the first network node; and execute the subset of features for the packet.

14. The second network node of claim 13, wherein the power consumption management logic is further configured to verify, before transmitting the second signaling, that the second network node is capable of executing the subset of features for the packet within the at least one power budget specification based on feature-to-power association data for the second network node and the at least one power budget specification.

15. The second network node of claim 13, wherein at least one of the first signaling or the second signaling is conveyed via a metadata channel or a signaling channel.

16. The second network node of claim 13, wherein the second signaling comprises an indication of a current power draw of the second network node.

17. The second network node of claim 13, wherein the second signaling comprises an indication of a per-feature power consumption at the second network node for at least one feature in the subset of features.

18. The second network node of claim 13, wherein the subset of features includes at least one of ternary content-addressable memory (TCAM) filtering, virtual private network (VPN) decapsulation, or deep packet inspection (DPI).

19. The second network node of claim 13, wherein the power consumption management logic is further configured to forward the packet to a next hop network node based on route data associated with the packet.

20. A method for network power consumption management, comprising:

identifying at least one power budget specification associated with a packet;

identifying one or more features associated with the packet;

determining a subset of features of the one or more features to be offloaded to a second network node based on the at least one power budget specification associated with the packet; and offloading the subset of features to the second network node.

* * * * *